United States Patent [19]
Molitor

[11] 3,981,699
[45] Sept. 21, 1976

[54] PURIFIER

[76] Inventor: Victor D. Molitor, 90 Corona St., Denver, Colo. 80218

[22] Filed: Oct. 25, 1974

[21] Appl. No.: 517,851

[52] U.S. Cl. ............................... 55/208; 55/269; 55/387
[51] Int. Cl.² .......................................... B01D 53/04
[58] Field of Search ............... 55/74, 208, 268, 269, 55/387, 389

[56] References Cited
UNITED STATES PATENTS

| | | | |
|---|---|---|---|
| 3,335,550 | 8/1967 | Stean | 55/208 |
| 3,364,654 | 1/1968 | Westbrock | 55/208 X |
| 3,469,375 | 9/1969 | Barrington et al. | 55/208 |
| 3,483,980 | 12/1969 | Cochran et al. | 55/269 X |
| 3,780,501 | 12/1973 | Porta et al. | 55/208 |
| 3,815,375 | 6/1974 | Inglis | 55/268 X |

FOREIGN PATENTS OR APPLICATIONS

| | | | |
|---|---|---|---|
| 553,950 | 6/1923 | France | 55/208 |

Primary Examiner—John Adee
Attorney, Agent, or Firm—Horace B. Van Valkenburgh; Frank C. Lowe

[57] ABSTRACT

A purifier which includes round and spiral labyrinth passages in heat exchange relationship with similar passages, the incoming passages leading to and the outgoing passages leading from a container for gettering material heated by electrical heaters. The circumferential walls of the round passages are attached together by angular offsets in opposed positions, preferably at about 45°. The spiral passages are formed by a circumferentially spiral plate with an end wall at each end of each passage. The plates may overhang the end walls, so that the plates can be melted back to fuse with the end walls. Also, the heat applied during such melting and fusion heats the end plates sufficiently to be readily bent into a spiral. A second container for gettering material may be located, with or without heating, along the outward path of the heated gases where the temperature will correspond to a lower temperature for further reaction of the gases with a gettering material.

In the event that the purifier is used in association with a glove box or the like in which contaminating materials are being handled, the gettering material may be placed in throw-away cartridges formed by spot welding or tack welding a perforated plate or screen to the ends of a tube or between the periphery of two spaced, parallel, circular plates.

7 Claims, 16 Drawing Figures

U.S. Patent  Sept. 21, 1976  Sheet 1 of 6  3,981,699
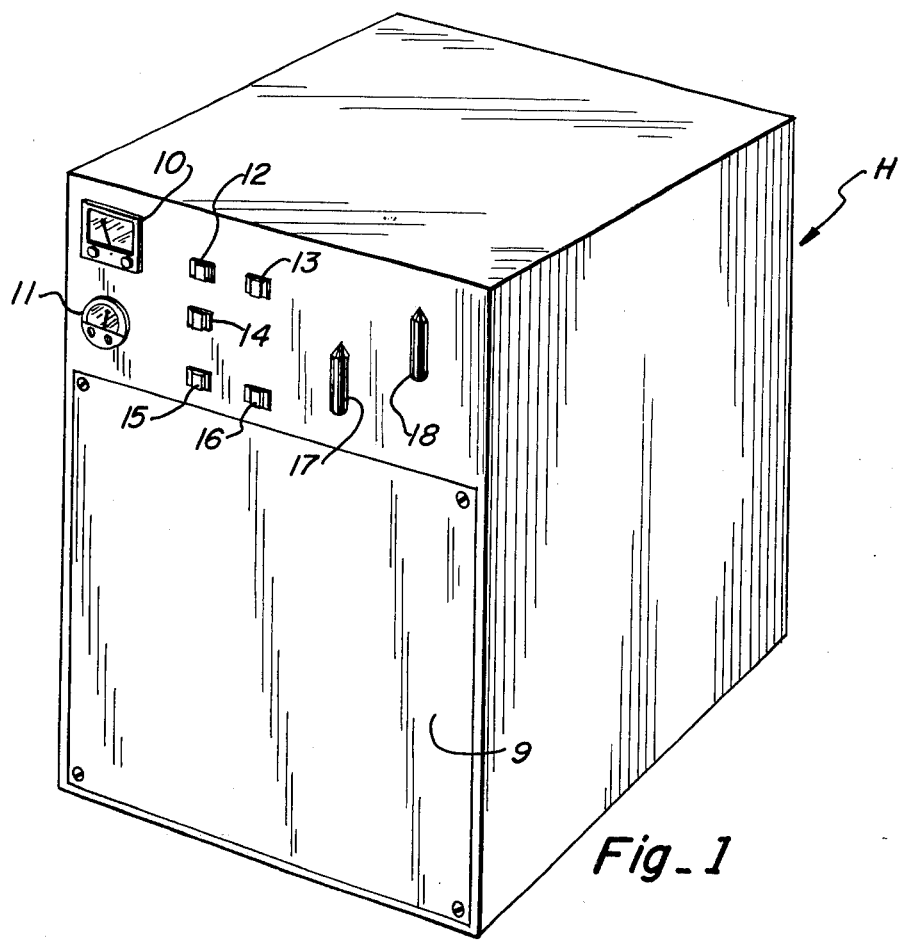
Fig_1
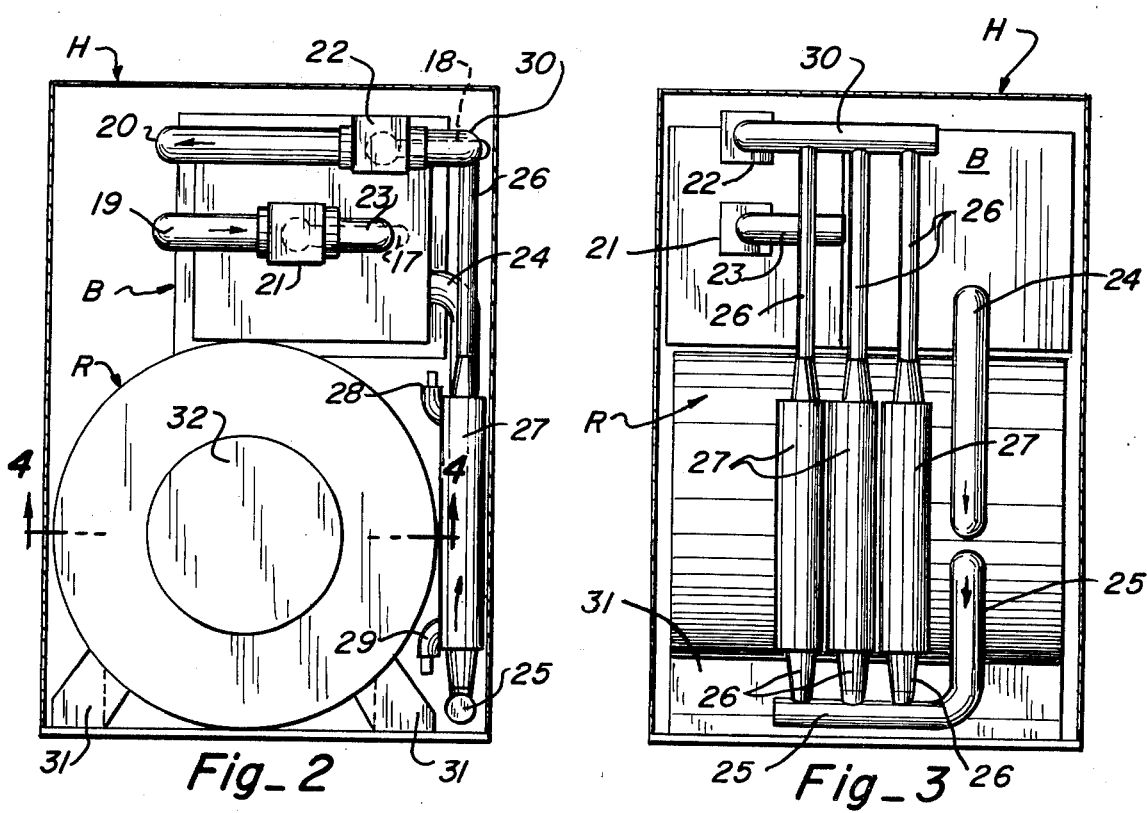
Fig_2    Fig_3

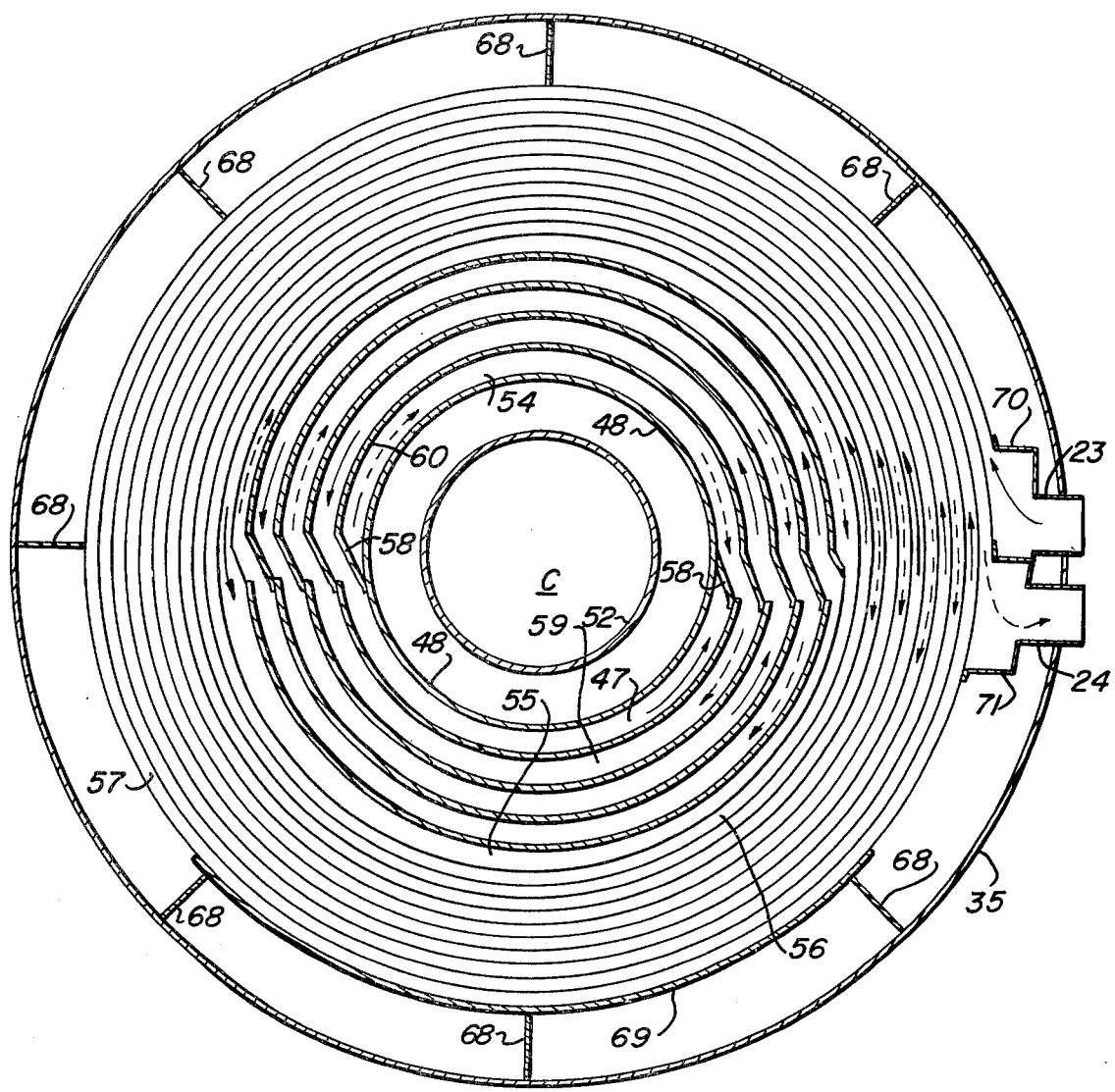
Fig_5
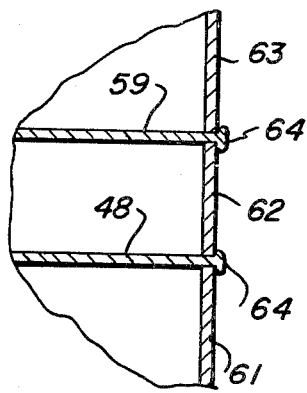
Fig_6
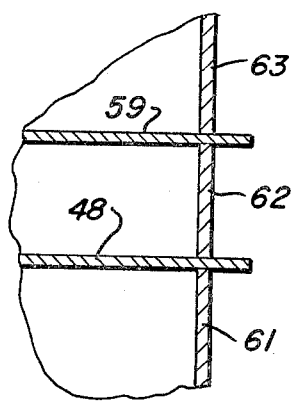
Fig_7
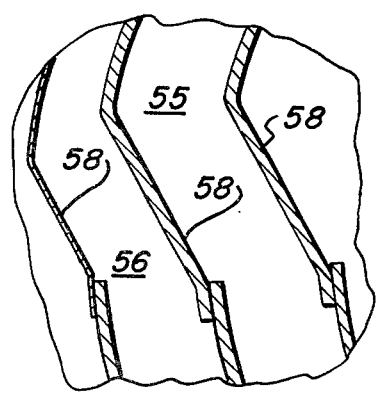
Fig_8

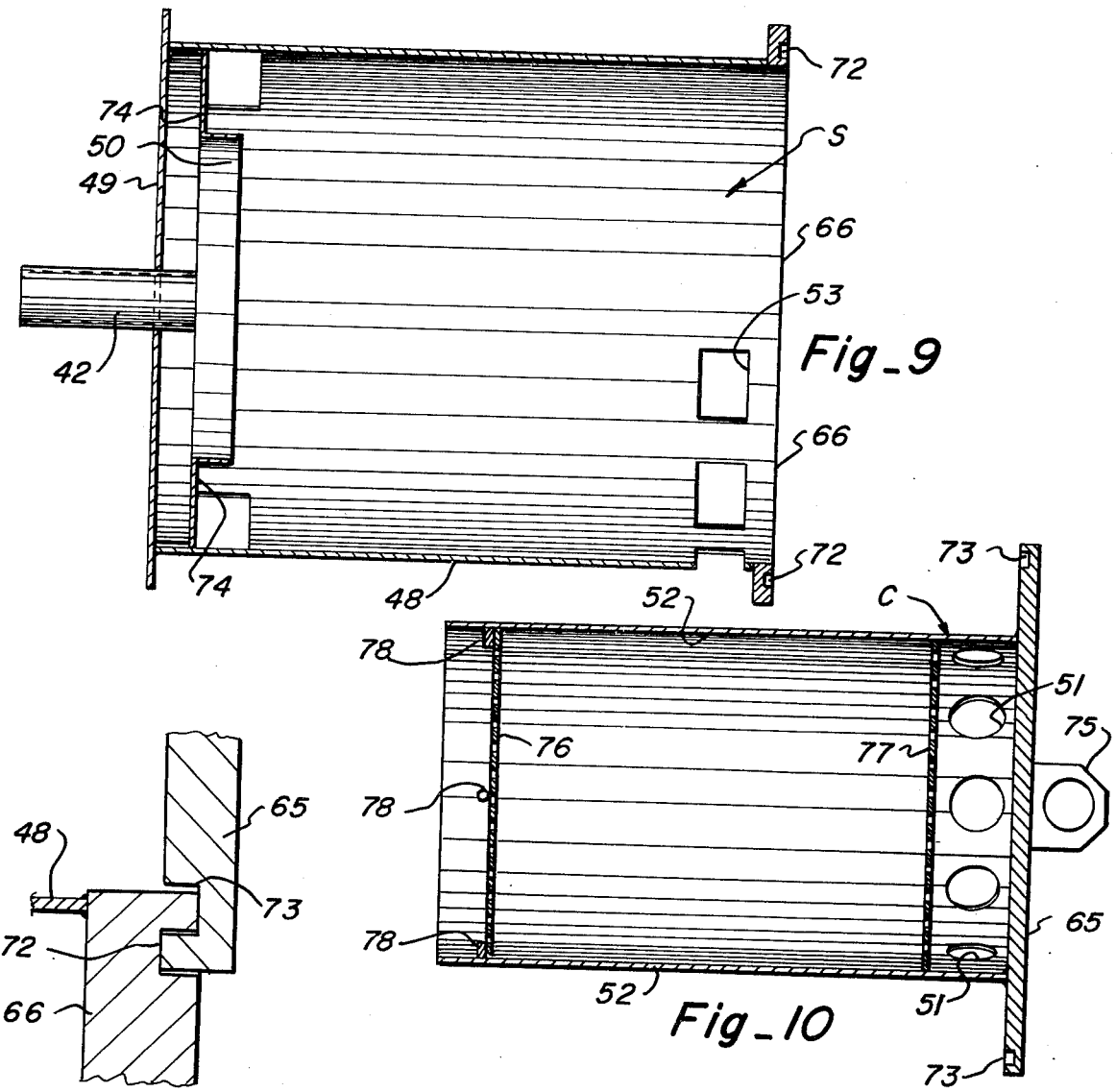
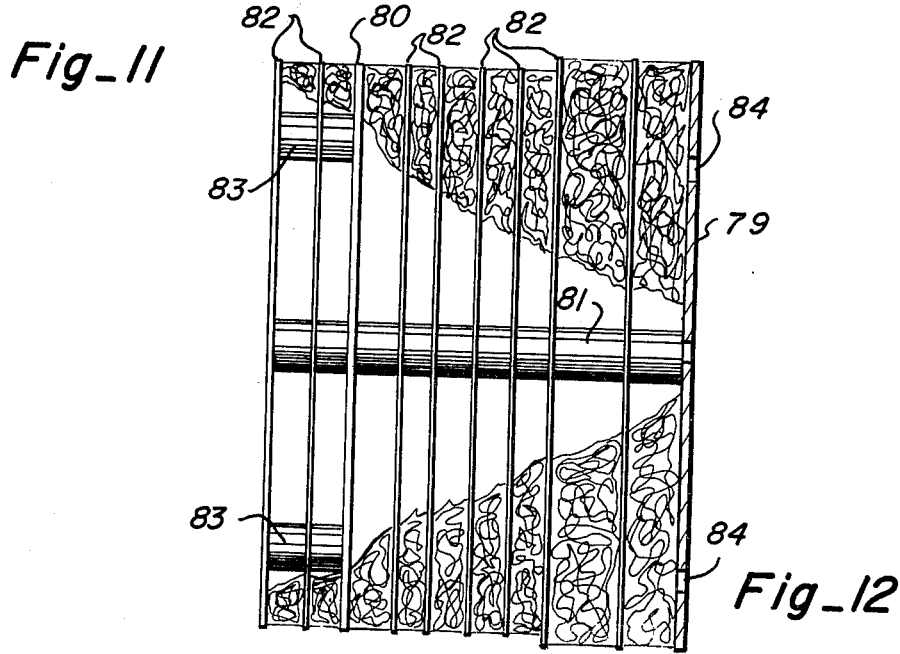

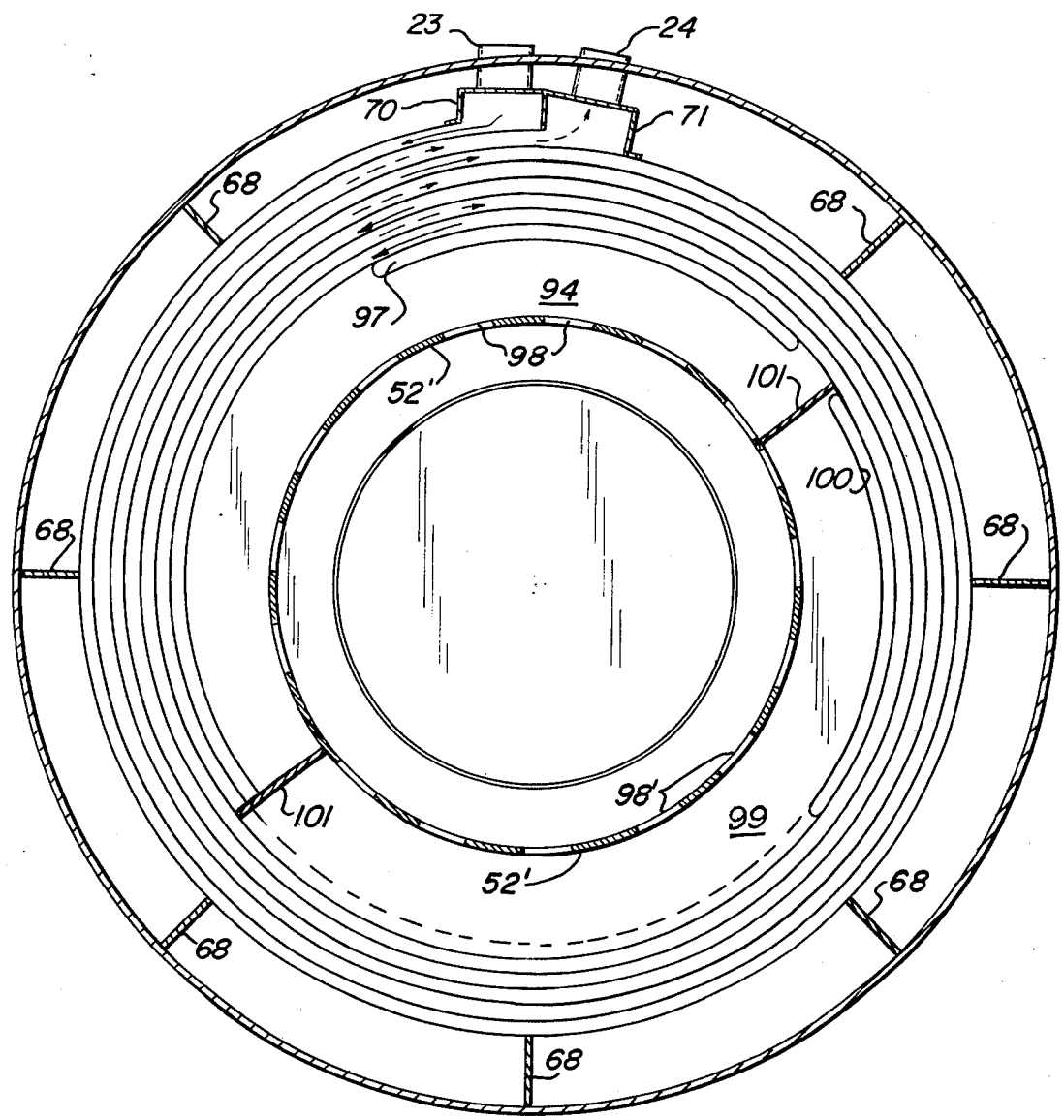
Fig_14
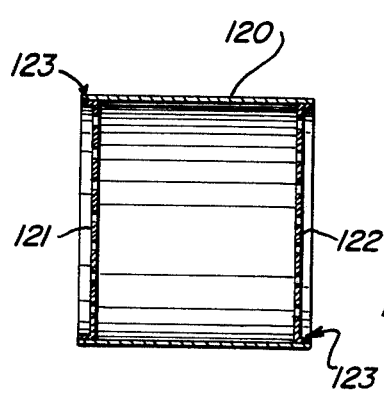
Fig_15
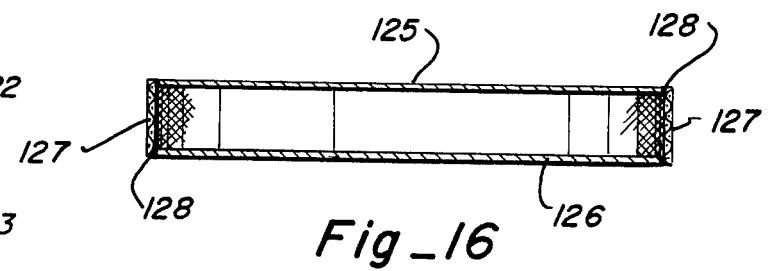
Fig_16

PURIFIER

This invention relates to purifiers, including purifiers provided with gettering material for removing desired gases and also purifiers for purifying by flash heating, such as the sterilization of air. Other and analogous uses will be evident to those skilled in the art.

This invention further relates to purifiers in the same manner as my copending application Ser. No. 463,458 filed Apr. 24, 1974, for "Purifier", in which is disclosed a purifier particularly adapted to purify gases, such as argon or helium, in a glove box or the like in which various operations may be carried out on a material sensitive to hydrogen, nitrogen, oxygen and/or water vapor. For the latter purpose, the purifier contains one or more chambers in which a gettering material is placed. In the latter instance, one chamber is heated to a higher temperature than the temperature present in the second chamber. In order to remove hydrogen to extremely low parts per million, as well as water vapor, and even nitrogen, from an argon or helium atmosphere, a specially treated sponge titanium is desirably used.

The present invention further comprises a unique assembly of first and second spiral passages which are in countercurrent heat exchange relationship, with the incoming gases being heated by heat exchange with the outgoing gases and the chamber, in which a gettering material may be placed, being heated by electrical resistance heaters, or in any other suitable manner. The spiral passages are formed by spiral plates between which narrow end walls are placed to form the passages, so that all the welding or joining may be done from the outside. Conveniently, the spiral plate or plates extend outwardly beyond the narrow end walls, so that fusion, in many instances, may be accomplished merely by melting the projecting edge of a spiral plate into fusion with the adjacent end walls.

In an alternative construction, two beds of gettering material may be utilized, with one operating at a higher temperature than the other. As in my aforesaid application Serial No. 463,458, the higher temperature bed may be heated, as by electrical heaters, while the lower temperature bed is heated by exhaust gases from the first bed, after being cooled to a desired degree by heat exchange with the incoming gases.

The achievement of the above and additional requirements of the invention will become apparent from the description which follows, then in conjunction with the accompanying drawings, in which:

FIG. 1 is a perspective view of a housing within which the parts of the purifier are installed FIG. 2 is a front elevation of the parts inside the housing.

FIG. 3 is a right side elevation of the parts inside the housing.

FIG. 5 is a transverse vertical section of the reactor, taken along line 5—5 of FIG. 4.

FIG. 6 is an enlarged detail of the connection between two spaced spiral plates and the intersecting end plates, shown in FIG. 4.

FIG. 7 is an enlarged detail similar to FIG. 6, but showing the parts prior to welding.

FIG. 8 is an enlarged detail of certain offsets in the spiral plates shown in FIG. 4.

FIG. 9 is a longitudinal section of a core cylinder of FIGS. 4 and 5.

FIG. 10 is a longitudinal section of a basket or chamber, which may contain a gettering material.

FIG. 11 is an enlarged detail showing the interengagement between the core cylinder and the chamber or basket.

FIG. 12 is a longitudinal section of an insulating plug of FIG. 4.

FIG. 14 is a transverse vertical section taken along line 14—14 of FIG. 13.

FIG. 15 is a longitudinal section of a disposable cartridge for gettering material.

FIG. 16 is a transverse section of an alternative disposable cartridge.

Figure 4:
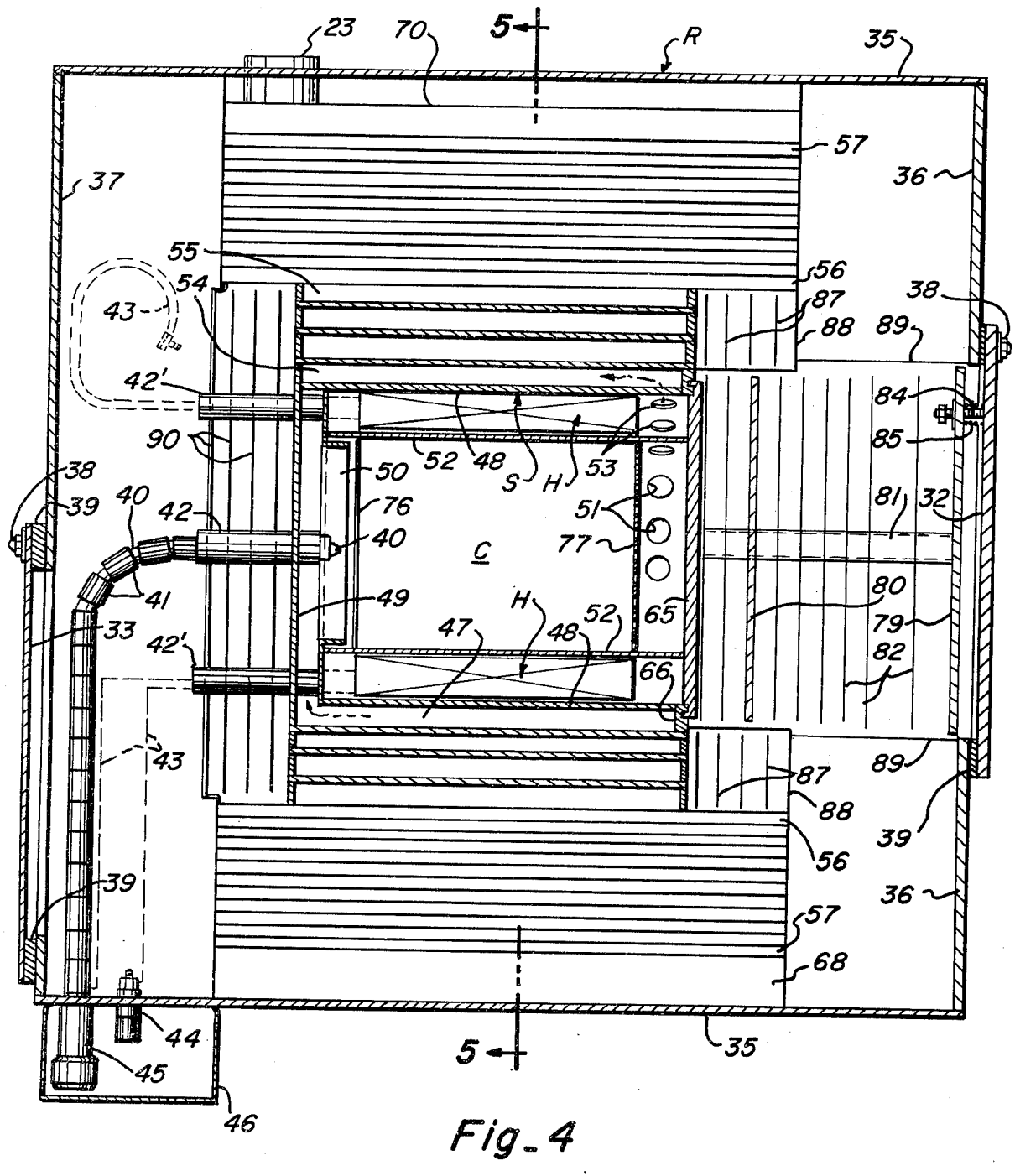
FIG. 4 is a longitudinal horizontal section of a heat exchange reactor, on an enlarged scale and taken along line 4—4 of FIG. 2.

As in FIGS. 1–3, the purifier of this invention may be mounted within a rectangular box or housing H which is provided with a removable access panel 9 attached to the front thereof, with a similar panel at the rear. The parts visible on the outside of the housing include a reactor temperature meter 10, a pressure guage 11 which indicates the pressure within the reactor and several off-on switches. The latter include a heater switch 12, a recirculating blower switch 13, a "low flow" switch 14, an evacuator switch 15 and a backfill switch 16. During normal operation, only the heater switch 12 and blower switch 13 are in the "on" position. A handle 17 for an inlet valve and a handle 18 for an outlet valve are shown in the "off" position in FIG. 1 but in dotted lines in the on position in FIG. 2. Within the housing H, as in FIGS. 2 and 3, are a reactor R and a blower B, with an inlet pipe 19 and an outlet pipe 20 extending from suitable connections at the rear of the housing respectively to and from an inlet valve 21 and an outlet valve 22, the respective handles 17 and 18 of which are shown in dotted lines in FIG. 2, as indicated previously. A pipe 23 connects inlet valve 21 with the blower B, while a pipe 24 connects the exhaust port of the blower B with the reactor R. From the reactor, an outlet pipe 25 curves to form a manifold to which a series, such as three, of heat exchange tubes 26 are connected. A cooling jacket 27 surrounds a portion of each tube 26, being supplied with cold water by an inlet 28 and discharging the water at an outlet 29. The flow of water through the heat exchange jackets is preferably counterflow to the passage of exhaust gases therethrough. From the tubes 26, the exhaust gases pass to a manifold 30 and thence through valve 22 to the discharge pipe 20. The reactor R, which may be generally cylindrical in shape, is equipped with legs 31 or any other suitable type of support, as well as a removable panel 32 on the front. As in FIG. 4, a similar removable panel 33 is at the rear.

The reactor R, as in FIG. 4, is provided with a cylindrical shell 35 and front and rear circular end plates 36 and 37, respectively. Each removable panel 32 and 33 is attached to the respective end plate by a series of studs and nuts 38 adapted to clamp the respective panel against a gasket 39. The reactor is also provided with a central chamber C, as for gettering material, and a core shell S, in which the chamber C is received. At the rear end of the core shell, a thermocouple 40 provided with insulation rings 41, such as of ceramic, extends through a positioning tube 42, while a series of heater leads 43 extend through additional positioning tubes 42' and to an appropriately placed connector 44, a pair of which may be spaced at each 120° of the circumference of the reactor, or which may be led to common connectors 44 at one side of the reactor shell 35. Thermocouple 40 similarly extends to a thermocouple connection 45, the connectors being positioned within a protective cover box 46.

In FIG. 5, the path of the incoming gas is shown by solid arrows, with the path of the outgoing gas being shown by dotted arrows. The heat exchange passages include a terminal half turn 47 for the incoming gases, the direction of flow of which in various parts of the apparatus being shown by full line arrows and the outgoing gases by dotted arrows. Half turn 47 partially encircles the outside of wall 48 of core shell S, with the incoming gases from turn 47 flowing between the rear end of the core shell S and an inner plate 49, thence through a circular opening within a flange 50 of core shell S, then through the gettering material (not shown) within the chamber C. After passage through the gettering material, the gases, heated by the shell and chamber walls and/or the gettering material, through heat supplied by a series of circularly placed electrical heaters H, exhaust from the front end of chamber C for passage through a series of holes 51 in the cylindrical wall 52 of chamber C, thence through holes 53 in wall 48, with the holes 51 and 53 extending only over half the circumference of the respective walls, so that the exhaust gases will be fed into a half turn 54 of the spiral passage for the outgoing gas.

As in FIG. 4, the same width of passage plates extends outwardly to a turn 55, then widen from a turn 56 to the final turn 57. The wider passage plates between turn 56 and turn 57 may be placed closer together in order to accommodate the same volume of gas. As in FIG. 8, an offset 58 joins the shell 48 with a half round plate 59 to produce the first incoming half turn 47, while a diametrically opposed, similar offset 58 joins the next shell with a half round plate 60 to produce the first outgoing half turn 54. Similarly, opposed offsets 58 continue outwardly to the turn 55, at which point the plates become spirals and also may become thinner, as shown, because of the reduced temperature causing less expansion or contraction during use. The angularity of an offsets 58 is important, since the offset perpendicular to the two half round plates which it connects will cause an obstacle to gas flow, thereby decreasing the flow rate and reducing the capacity of the purifier, as well as requiring more energy to push the gas through. As illustrated in FIG. 8, the preferred angle of offset 58 is shown as being about 45° to the extension of each of the plates to which it is connected.

The attachment of the plates, such as plates 59 and 60, to the passage end walls 61, 62 and 63 is shown in FIG. 6 as being by solidified molten metal 64, such as weld material, joining the plates to the end walls. A simplified method of construction in which the extended ends of the plates, such as plates 48 and 59, are merely melted to form a weld with the respective plates 61, 62 and 62, 63 is illustrated in FIG. 7 in which plates 48 and 59 extend beyond the plates 61, 62 and 63. As will be evident, any other suitable method of joining the spiral plates to the end walls may be utilized, although the melting of the extended plates has the advantage of, first, being on the outside and, secondly, the extended edges of the plates are melted readily by a flame of sufficient temperature. The heat of welding or fusing is also normally sufficient to heat the end plate, so that it may be bent to conform to the spiral, as it is welded.

The end of shell S is closed by an end plate 65 having a tongue and groove interfit with a ring 66 which forms a part of shell S but also forms one end wall of passages 47 and 54. The spiral plate which forms the outer wall of the outermost turn 57 is held in position spaced from the outer casing 35 of the reactor by spacing bars 68 which are connected to a saddle plate 69. The outermost turn for the incoming gases is connected to a box 70 which is connected to the inlet 23, with a similar box 71 connected to outlet 24 for the outgoing gases.

As shown in FIG. 9, an outwardly facing groove 72 is formed in ring 66, while as shown in FIG. 10, the plate 65 is provided with an inwardly facing groove 73. As in FIG. 11, the grooves interfit with the adjacent end portions of the plate and ring, respectively, to form a tight seal. The shell S is further provided with an interior flange 74 which supports the flange 50, as in FIG. 9. Also, the container C for the gettering material, as in FIG. 10, is provided with a pair of handles 75, by which the container may be removed from and inserted in the shell S. Inside the container C are a pair of apertured plates 76 and 77, to hold the gettering material within the container, the apertures permitting gases to be treated to flow through the inlet plate 76, with the gases flowing out through the apertures in outlet plate 77. For filling the container with gettering material or removing such material, the inlet plate 76 is removable, being held in position by removable pins 78 spaced around the periphery thereof, or in any other suitable manner. Between the cover plate 32 and the container C, as in FIG. 4, is an assembly of baffle plates and discs, such as outer baffle plate 79 and an inwardly disposed baffle plate 80 connected together by a central tube 81, as in FIG. 12, and on which a series of discs 82 are mounted. The discs adjacent container C are reinforced by auxiliary tubes 83, as in FIG. 12, while the space within the baffle assembly is filled with insulation, as shown. A spaced series of bolts 84, as in FIG. 4, connect the front removable panel 32 with the baffle plate 79, while a series of coil springs 85, which surround the respective bolts, will press the baffle plate assembly toward the container C to maintain the interlocking groove connection in a tight condition. As in FIG. 12, plate 79 has holes to accommodate the bolts 83. A series of ring-shaped discs 87 surround the plate 80 and adjacent discs 82. Insulation of a suitable character is placed between the rings 87, with a circular baffle 88 having a radial flange securing the insulation in position. The remainder of the spaces within shell 35, both in front of and behind the heat exchange passages, are filled with insulation of a suitable character. It will be noted that a ring 89, which may be inserted in the opening for removable panel 32, maintains insulation in the space between the heat transfer passages and the inside of end plate 36. The space rearwardly of the shell S and the passages 54, 55 also contains insulation between a series of discs 90, to which the guide tubes 42 and 42' are attached. The remainder of the space at the rear is also filled with insulation of a suitable type.

Figure 13:
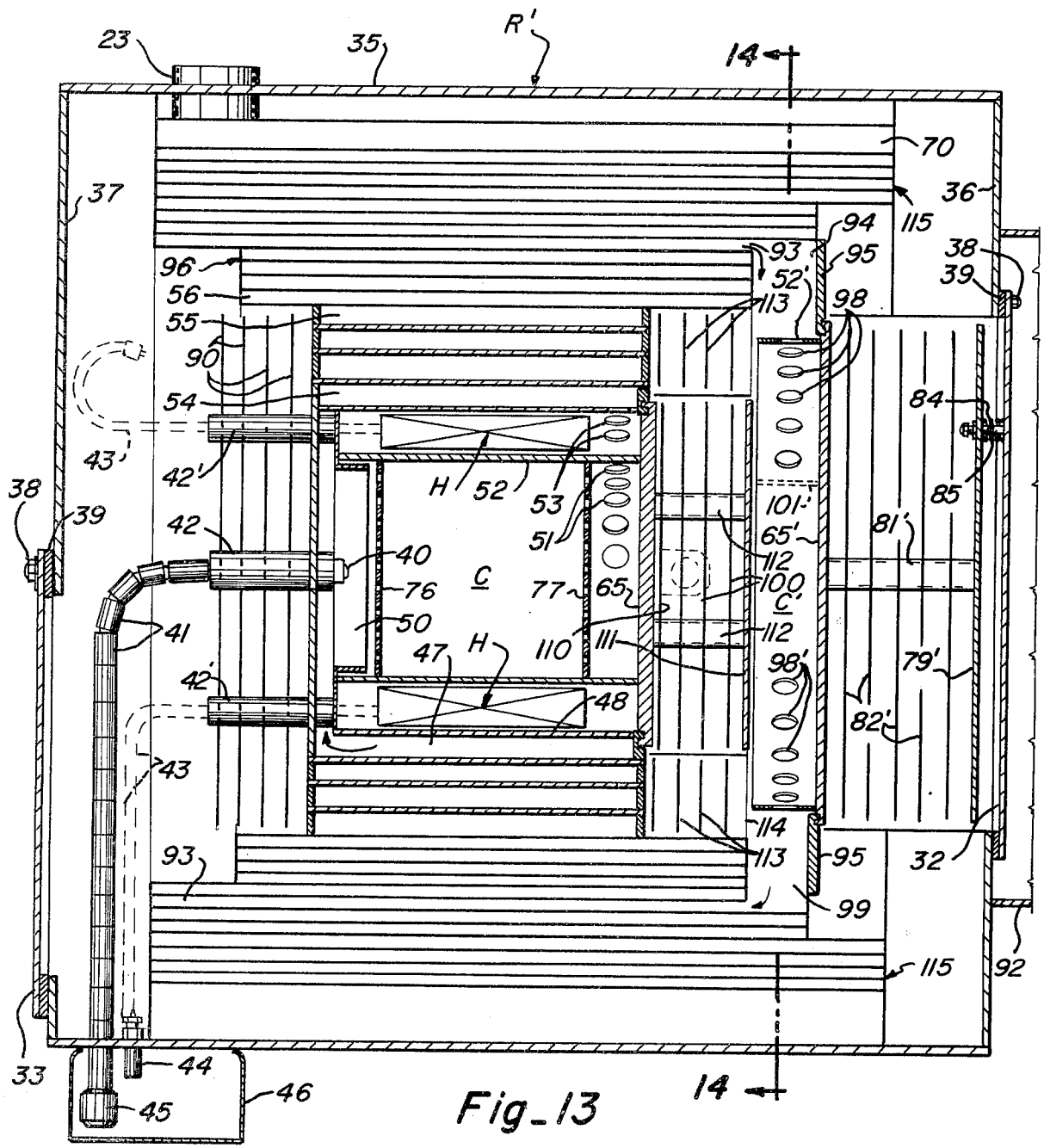
FIG. 13 is a longitudinal horizontal section corresponding to FIG. 4 but showing a dual bed heat exchange reactor.

The alternative construction shown in FIGS. 13 and 14 is similar, in many respects, to the construction just described but has a higher temperature chamber C and a lower temperature chamber C' which receives the gases at a lower temperature, i.e. the gas having dropped in temperature because of heat exchange with the incoming gas between chambers C and C'. Thus, it is normally unnecessary to use separate heaters for the second, lower temperature chamber, but the same may be utilized, if desired. The same or different gettering material may be utilized in the respective chambers C and C'. However, for extremely low residuals, as with argon or helium, the gettering material may be previously treated sponge titanium. The titanium bed in chamber C may be heated by the heaters H to a temperature on the order of 1300°F, with the outgoing gases reaching the second chamber C' at a temperature on the order of 900°F. These bed temperatures have been found to be particularly advantageous in removing hydrogen below 14 parts per million from inert gases, such as argon or helium.

The reactor R' of FIGS. 13 and 14 includes a shell 35 having end plates 36 and 37 to which removable panels 32 and 33 are respectively attached with bolts 38 and a gasket 39 functioning as before. In addition, a so-called "bag out" ring 92 may, if desired, be mounted on the end plate 36, as by welding. This bag out ring is conventional in configuration and is utilized for the bagging upon removal of the chambers, or of insulation, or of other parts, and material, when there is a possibility of these parts or material becoming radioactive, due to the nature of the operation being carried on in the glove box or the like whose gas or gases are being circulated through the purifier. The chamber C of FIG. 13 is essentially the same in construction as chamber C of FIG. 5, the same parts being denoted by the same reference numerals. However, when the gettering material is to be discarded due to radioactivity, the chambers may be simple rings with a screen tack welded on each end. In such an instance, the plate 65 may be separate from the container. The inlet and outlet passages, inwardly from passage 55, are also essentially the same in construction as those previously described. However, at an outlet passage 93, the outwardly flowing gases are directed through a space 94 formed between an end ring 95 and the end walls of a group of laterally extended passages 96 which have a lesser width than passage 93. The gas flowing into the space 94, as in FIG. 13, flows through a slot 97 of FIG. 14 from passage 93, to enter a portion of the circumference of chamber C through holes 98 in a shell 52' for flow through the gettering material within the chamber C. The gases exit through holes 98' into a space 99 and flow through a slot 100 into the same outlet passage 93, with the spaces 94 and 99, as in FIG. 14, being separated by divider plates 101, which also separate the slots 97 and 100. In effect, the plates 101 divide one of the outlet passages into two halves, from the innermost of which the gas flows to the chamber C and through the outermost of which the gases flow from chamber C.

The chamber C' is provided with an end plate 65' which is provided with an inwardly facing slot engaging an outwardly facing slot in ring 95 in a manner similar to that illustrated in FIG. 11. Between chamber C and C', a series of discs 110 are attached to a circular plate 111 through tubes 112 and contain suitable insulation therein. Outwardly of discs 110 is a series of ring discs 113 which are permanently installed, since they do not need to be removed for removal of container C or C'. Again, the discs 113 are filled with insulation, as of the type previously referred to, and may be attached to a circular angle 114. Between container C' and removable panel 32 is again installed a series of discs 82' connected to a baffle plate 79' by a tube 81', this assembly containing insulation and being removable with the access panel 32 to which the assembly is attached by a series of bolts 84, each surrounded by a coil spring 85.

Outwardly from passage 100, the spiral passageways, such as formed in the manner described previously, extend outwardly at one side the same lateral distance as ring 95 and for a greater lateral distance at the rear. Finally a set of passages 115 extend laterally at each end for the same distance. As before, the incoming gas is received in an inlet box 70 from inlet pipe 23 for passage through the heat exchange passage to chamber C, the gas being preheated by heat exchange with the outgoing gas, and then heated to the desired temperature by the electrical heaters H. Between chamber C and C', the previously heated gases are in heat exchange relation with the gases proceeding toward chamber C, so that the gases are cooled sufficiently, i.e. to a temperature of approximately 900°F, suitable for the removal of $H_2$, for instance. From the chamber C', outgoing gases are again in heat exchange relation with the incoming gases, with the outgoing gases being received in outlet box 71, for discharge through outlet pipe 24.

Each chamber C is preferably made of steel, either hot rolled or cold rolled, while the remainder of the heat transfer passages, as well as chamber C', may be formed of stainless steel. The temperature to which the gettering material in chamber C is heated, i.e. around 1300°F, is sufficient to cause titanium to fuse with stainless steel, apparently because of the chromium in stainless steel. Also, the electric heaters are preferably formed of an aluminum alloy, since a nickel-chromium heater may decompose at such temperature in the presence of titanium. Some of the cooler passages may be formed of copper to increase heat conductivity, although the rapid conduction of heat through the copper, with consequent heat dissipation on the outside, may militate against such use of copper.

A discardable canister, as indicated previously, may be utilized with the container C or C' when the gettering material is exposed to radioactive material and must be discarded after use. Such a canister is shown in FIG. 15 and may comprise a tube 120 in the ends of which circular perforated plates 121 and 122 are attached, as by spot welds 123. When the canister of FIG. 15 is used, the perforated plates 76 and 77 of FIGS. 4 or 13 are omitted, the canister being merely placed in the container C.

When the purifier of FIGS. 13 and 14 is used, the canister of FIG. 16 is placed within container C'. This canister comprises a pair of spaced, parallel circular plates 125 and 126 to the peripheral edges of which a screen 127 is attached, as by tack welds 128. As will be evident, the canister of FIGS. 15 and 16 is filled with gettering material prior to the spot welding or tack welding. When the gettering material has been exhausted, the canister containing it may be discarded along with other radioactive wastes.

Although preferred embodiments of this invention have been illustrated and described, it will be understood that other embodiments may exist and that various changes may be made, without departing from the spirit and scope of this invention.

What is claimed is:

1. A purifier comprising:

a first series of generally concentric spiral passages interspaced and in heat exchange relationship with a second series of generally concentric spiral passages;

a container for gettering material disposed centrally of said first and second series of passages;

each said series of spiral passages including spiral plates and end walls between said plates forming the opposite ends of the respective passages;

a heater for heating said gettering material to a predetermined temperature and for heating the gases passing through said container;

means for conducting untreated gases to the outer of said first series of passages; and means for conducting the outgoing heated gases from said container to the inner of said second series of passages.

2. A purifier as defined in claim 1, wherein:

said spiral passages of each series adjacent said container are connected to preceding passages by opposed offsets disposed at an angle of about 45° to an extension of the inner passage wall connected thereto.

3. A purifier as defined in claim 1, including:

a second container for gettering material;

means for feeding gases to said second container from said first container through a predetermined number of said second series of passages, including an opening in an end wall of one of said passages and leading to said second container;

an opening in said end wall spaced from said first opening for receiving gas from said second container; and baffle means for separating said first and second end wall spaces and simultaneously requiring flow through said second container from one side thereof and flow from said second container at the opposite side thereof.

4. A purifier as defined in claim 1, wherein:

said end walls are attached to said spiral plates by welding.

5. A purifier as defined in claim 1, wherein:

said spiral plates initially overhang said end walls; and said spiral plates are secured to said end walls by melting the overhanging portion thereof.

6. A purifier comprising:

a series of incoming spiral passages interspaced and in heat exchange relationship with a series of outgoing spiral passages;

an outer shell and ends for said shell, said passages being disposed within said outer shell;

an inlet for incoming gas and a longitudinally extending box connected to said inlet, said incoming spiral passages extending inwardly, within said shell in spiral relation from said box;

an outlet for outgoing gas and a longitudinally extending box connected to said outlet, said outgoing passages extending in spiral relation outwardly to said box;

a central container adapted to contain gettering material and provided with a perforated inlet plate adjacent one end and a perforated outlet plate adjacent the opposite end;

a series of heaters surrounding said container and extending longitudinally approximately the distance between said inlet and outlet plates of said container, said container extending past said outlet plate and such extension being provided with a series of holes for carrying outgoing gases outwardly;

a shell surrounding said heaters, with one wall of said shell being provided with a series of holes, a portion of said wall forming the inner wall of the first outgoing passage and an end wall of said shell forming a space longitudinally of said container, with the innermost incoming passage connecting with said space;

the opposite end of said shell being a plate formed with an interlocking tongue and groove connection with the end wall of the first inner passage;

a set of baffles retaining insulation at each of said shell, said baffles at one end being attached to rigidifying tubes in which leads to said heaters are disposed; and a tube which centrally reinforces and is attached to said end baffles for receiving a thermocouple and the leads therefor.

7. A purifier as defined in claim 6, including:

a second container for gettering material having an outer wall and disposed longitudinally from said first container;

insulation between said containers;

a series of holes in one side of the wall of said second container for incoming gas and an opposed series of holes in the wall of said container for outgoing gas;

an opening in the end wall of one outgoing passage at a position corresponding to the temperature to be maintained in said second container through the cooling of the outgoing gases by the heat transfer to the incoming gases;

a cylindrical space surrounding said second container, to a portion of which said opening leads;

a second opening in an end wall of the same outgoing passage and connected with a space around said outlet holes in said second container;

an end plate closing said second container and having a tongue and groove fit, with a ring which forms one side of said incoming and outgoing passages; and a pair of baffles extending in diametrically opposed positions from said container to said outlet passages and which separates the spaces around said second container and also the portions of said outgoing passage from which and to which said gases flow.

* * * * *